(No Model.)  5 Sheets—Sheet 1.
W. WALTER.
CHOCOLATE DIPPING OR COATING MACHINE.
No. 533,974.  Patented Feb. 12, 1895.
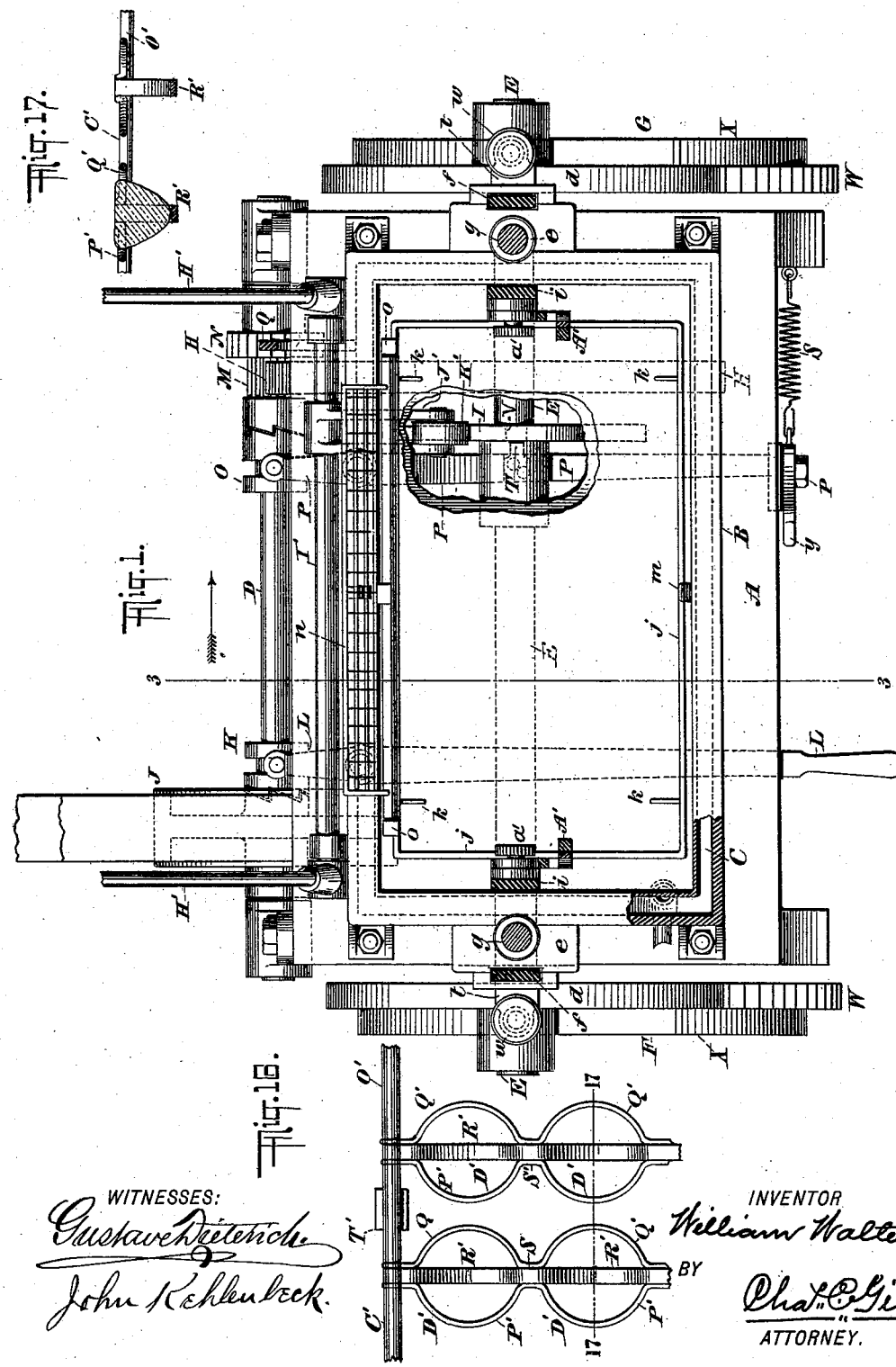
WITNESSES:
Gustave Dieterich
John Kehlenbeck
INVENTOR
William Walter,
BY
Chas. E. Gill
ATTORNEY.

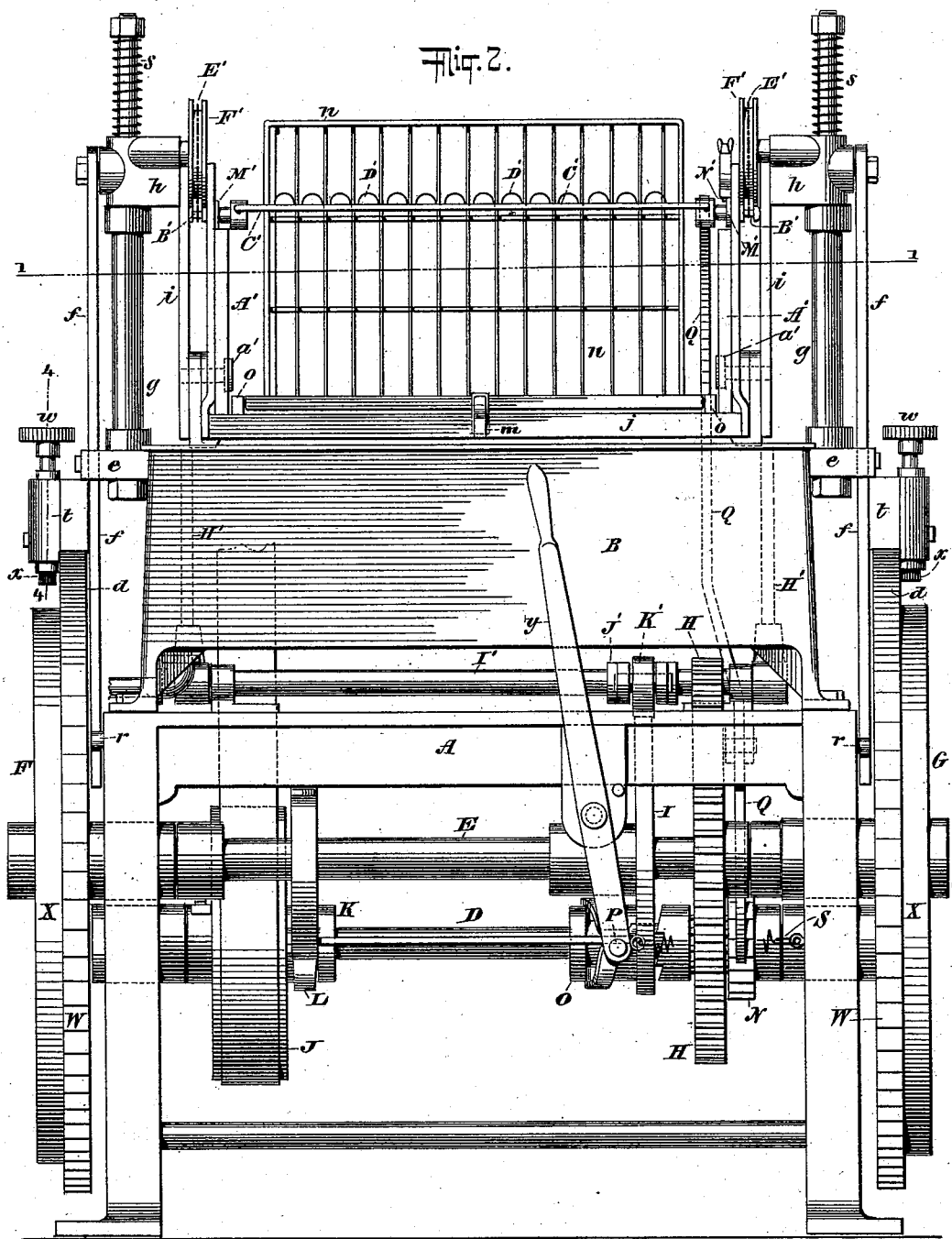

(No Model.) 5 Sheets—Sheet 3.
W. WALTER.
CHOCOLATE DIPPING OR COATING MACHINE.
No. 533,974. Patented Feb. 12, 1895.
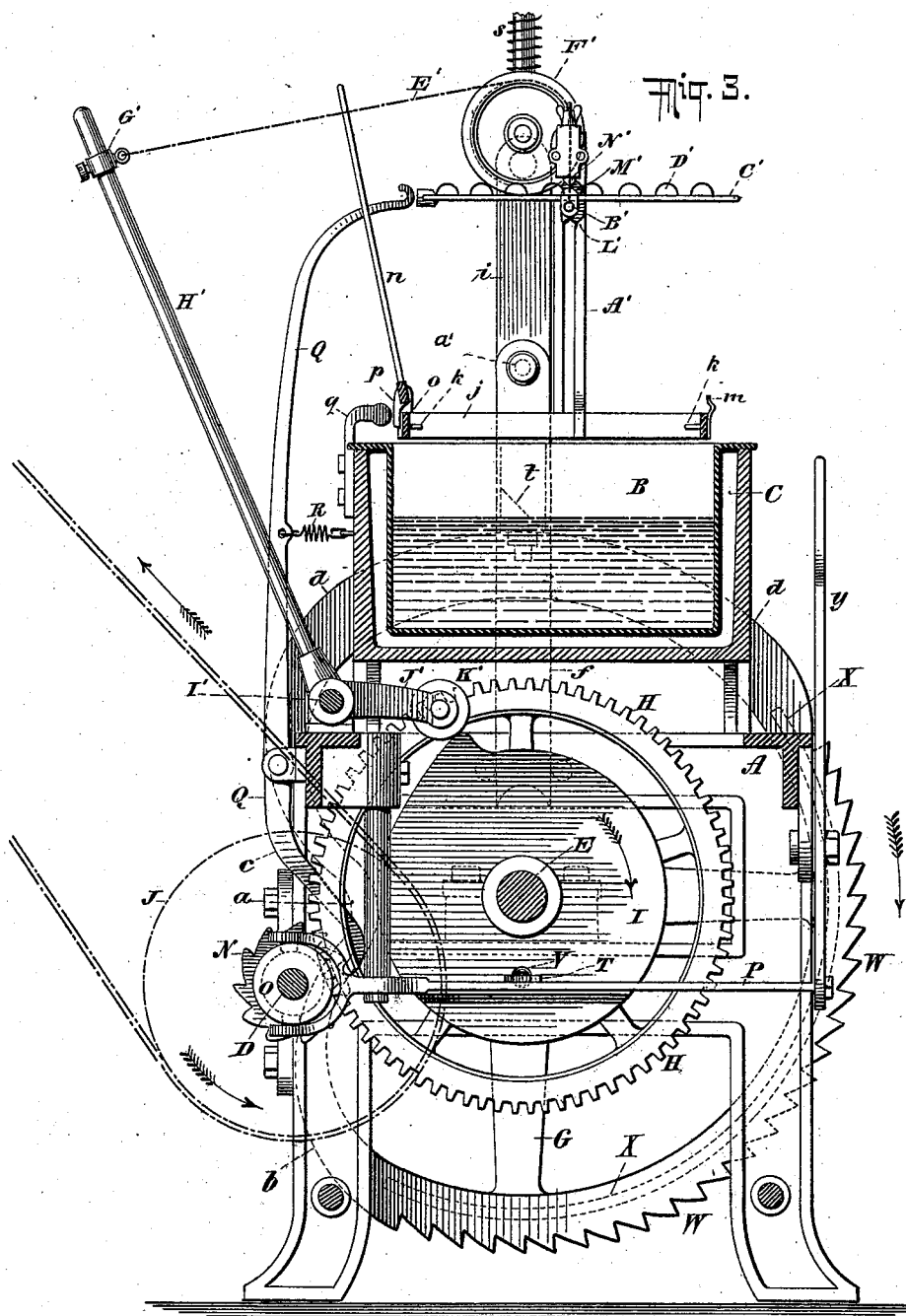

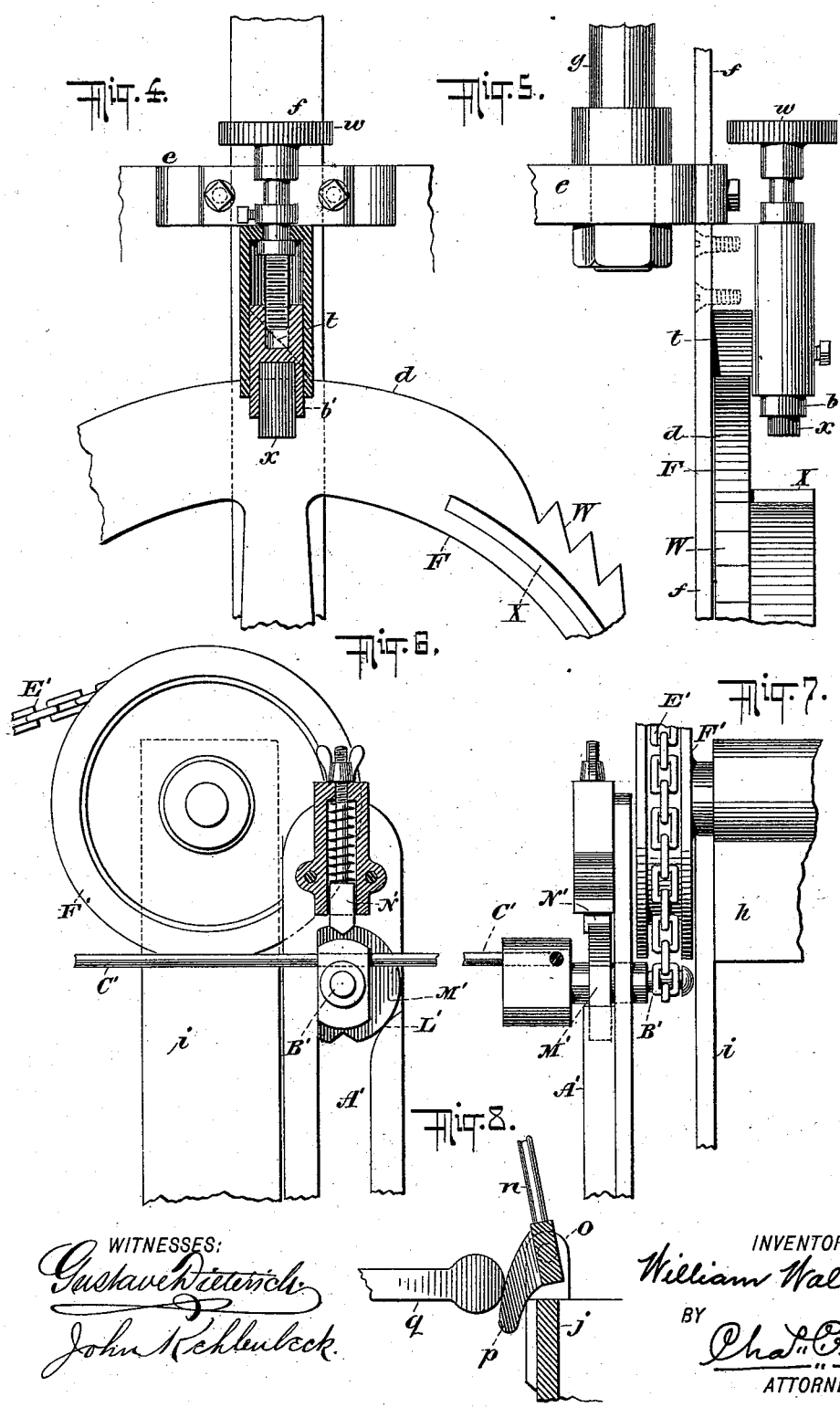

(No Model.) 5 Sheets—Sheet 5.
W. WALTER.
CHOCOLATE DIPPING OR COATING MACHINE.
No. 533,974. Patented Feb. 12, 1895.
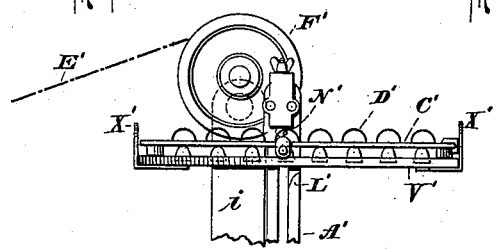
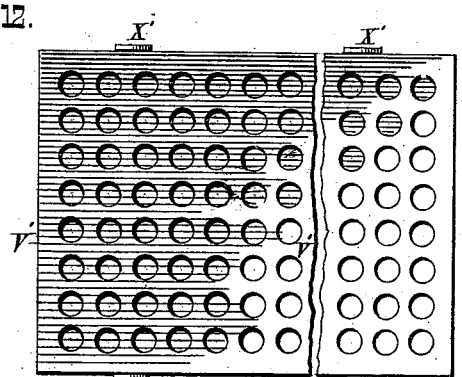
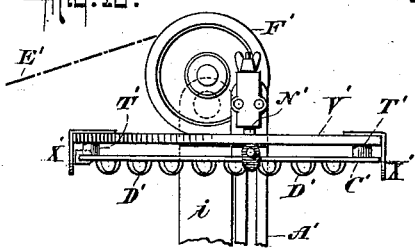
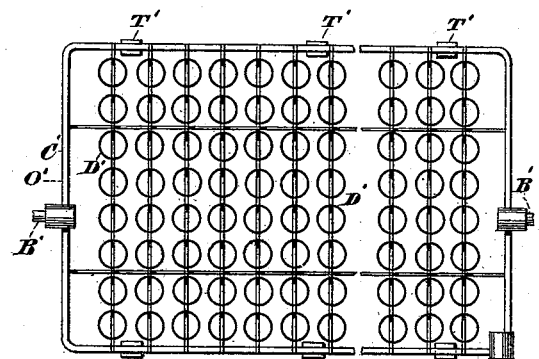
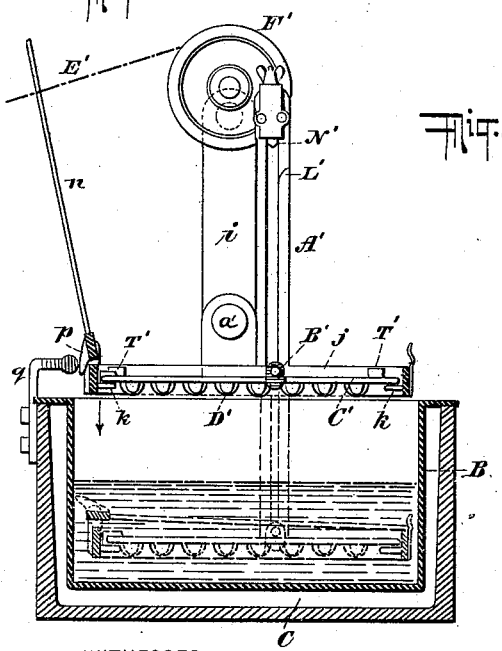
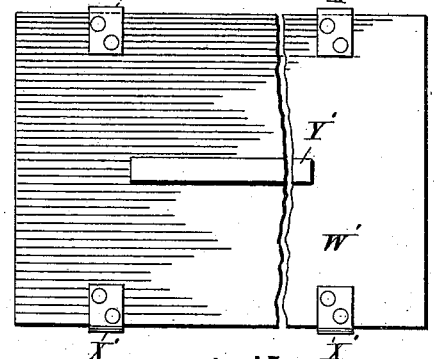
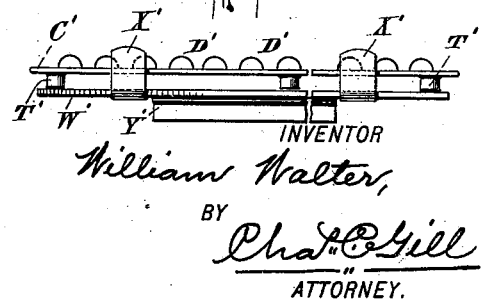
WITNESSES.
Gustave Dieterich.
John Kehlenbeck.
INVENTOR
William Walter,
BY
Chas. C. Gill
ATTORNEY.

UNITED STATES PATENT OFFICE.

WILLIAM WALTER, OF NEW YORK, N. Y., ASSIGNOR TO THE WALTER-CHAURANT COMPANY, OF SAME PLACE.

CHOCOLATE DIPPING OR COATING MACHINE.

SPECIFICATION forming part of Letters Patent No. 533,974, dated February 12, 1895.

Application filed August 20, 1894. Serial No. 520,815. (No model.)

*To all whom it may concern:*

Be it known that I, WILLIAM WALTER, a citizen of the United States, and a resident of New York, in the county of New York and State of New York, have invented certain new and useful Improvements in Chocolate Dipping or Coating Machines, of which the following is a specification.

The invention relates to improvements in machines for coating pieces of cream, caramel, candy or other filling material with chocolate or other substance by dipping the same into the liquid chocolate or other substance and after elevating the same therefrom subjecting the tray carrying the then coated pieces to a concussive action by which the surplus chocolate is removed from the pieces and the latter are left in a finished condition.

The machine embodying my invention comprises a hot water or steam-jacket oblong receptacle adapted to contain the chocolate or other coating substance, a tray located normally over said receptacle and formed with a series of pockets each to hold one piece or drop to be coated, a hinged open-frame lid or cover for said tray and adapted to retain the said pieces or drops in said pocket, means for lowering said tray carrying the pieces to be coated into the chocolate or other substance within said receptacle and then elevating the same to about the upper edge of said receptacle and there temporarily arresting it, means for jarring said tray while thus arrested to cause the removal of all superfluous chocolate from said pieces then coated, and means for thereafter elevating said tray to its higher position where the coated pieces are removed and additional uncoated pieces are placed into the pockets thereof to be coated during the succeeding descent of said tray. In accordance with a portion of my invention the said tray having pockets to receive and carry the pieces to be coated is made reversible for convenience in quickly applying and removing the said pieces and in causing them to be dipped while their upper surfaces are pointing downward; and in accordance with a further part of my invention the pivots sustaining said movable tray have cams by which when said tray is elevated to its higher position and then reversed to turn the open mouths of the pockets downward, the said tray will reach a slightly greater elevation and be brought into line with a vibrating arm which will strike against the then reversed tray and jar the coated drops or pieces therefrom upon a suitable plate held by the attendant to receive them.

The machine embodying my invention is provided with two independent clutches, one to communicate the power to the driving shaft and the other to automatically stop the machine at the end of each ascent of the vertically movable tray and afford means for manually starting the machine again as soon as the coated pieces have been removed from the pockets of the tray and their places filled with uncoated pieces. The first mentioned clutch enables the operator to stop the machine at any point, while the other clutch operates automatically to stop the machine at the end of each ascent of the vertically movable tray.

The invention embraces further novel features of construction and combination of parts, all as hereinafter more fully described, and particularly pointed out in the claims.

Referring to the accompanying drawings forming a part of this specification, Figure 1, is a top view partly broken away and partly in section of a machine constructed in accordance with and embodying the invention. Fig. 2, is a front elevation of same and indicating by dotted lines 1—1 the section on which Fig. 1 is taken. Fig. 3, is a vertical transverse section of same on the dotted line 3—3 of Fig. 1. Fig. 4, is an enlarged detached sectional view of a portion of the same on the dotted line 4—4 of Fig. 2. Fig. 5, is an enlarged detached side elevation of those portions of the machine illustrated in Fig. 4. Fig. 6, is an enlarged detached view partly in section of a portion of the reversible tray adapted to carry the pieces or drops to be coated with coacting devices, the said tray being illustrated in its reversed position with the bottoms of the pockets which receive said pieces turned upward. Fig. 7, is a side elevation of those portions of the machine illustrated in Fig. 6. Fig. 8, is an enlarged detached sectional view showing the means for elevating the cover which closes downward upon the tray carrying the pieces to be coated. Fig. 9, is a detached view illustrating the tray which carries the pieces to be coated and displaying the first step in the operation of introducing the said pieces to the pockets of said tray. Fig. 10, is a like view of same illustrating the second step in applying the pieces or drops to be coated to the said tray; this figure illustrating the said pieces or drops within the pockets of the said tray. Fig. 11, is a vertical transverse section through the upper portion of said machine and illustrating the vertically movable tray carrying the drops or pieces to be coated in in its position upon the independent supporting frame, and, also, by dotted lines the position of said tray and frame when lowered into the liquid coating substance contained in the receptacle. Fig. 12, is a front view of the frame or board utilized in applying the pieces to be coated to the tray by which they are lowered downward. Fig. 13, is a top view of the vertically movable tray having the pockets to receive the pieces to be coated. Fig. 14, is a bottom view of the plate utilized in removing the coated pieces or drops from the vertically movable tray illustrated in Fig. 13. Fig. 15, is a view of said plate shown in its relation to the said tray which carries the drops or pieces to be coated. Fig. 16, is an enlarged detached view of a portion of the vertically movable tray carrying the drops or pieces to be coated and illustrating on an enlarged scale the manner of forming the independent pockets to receive said pieces or drops, and Fig. 17, is a vertical section of same on the dotted line 17—17 of Fig. 16, and showing in one of the pockets a confection to be coated.

In the drawings A designates the main supporting table or frame of the machine, and upon this table is securely bolted the receptacle B adapted to contain the chocolate or other substance and provided with the water jacket C, the latter being of usual construction and adapted to receive hot water for heating the contents of the receptacle B.

The main driving shaft is designated by the letter D, and the auxiliary driving shaft by the letter E, the latter having at its ends the corresponding cam wheels F, G, and intermediate said ends the gear wheel H and cam I. Upon the driving shaft D is mounted the belt wheel J, the latter being adapted to turn freely on said shaft or to be locked thereto by means of the sliding clutch K, which is adapted to be moved toward or from the said belt wheel J by means of the hand lever L. When the clutch K, by means of said lever L, is moved to engage the belt wheel J, the motion of the latter will be communicated to the shaft D, and when the said clutch K is moved from contact with the wheel J, the latter will turn freely on the shaft D without rotating the latter.

Upon the shaft D and at the end thereof opposite to the belt wheel J, is provided the pinion wheel M and the ratchet wheel N and the clutch O, the said pinion wheel being loose on the shaft D, while the clutch sleeve O is keyed thereon and is adapted to be operated by the hand lever P for the purpose of causing the said pinion to rotate with the shaft D or to be cut off therefrom.

In accordance with my present invention, the clutch sleeve O with its lever P is arranged to be removed from the pinion automatically at a definite point in the operation of the machine, as will be hereinafter explained.

The ratchet wheel N is fast upon the shaft D and co-operates with the pivoted rod Q, which extends upward toward the upper part of the machine and is provided with a spring R which creates in said rod a constant tension toward the machine. The rotation of the ratchet N against the lower end of said rod Q causes said rod under the tension of the spring R to have the vibrating movement which is utilized at the proper time to facilitate the removal of the coated pieces or drops from the pockets of their carrying tray as hereinafter more fully explained.

The pinion M is in engagement with the gear wheel H located upon the auxiliary shaft E and through the pinion M and gear wheel H the motion of the driving shaft D may be communicated to the shaft E and the cam I thereon. The hand lever P extends from the clutch sleeve O toward the front portion of the machine and is provided with a spring S and stud T, the former creating a tension in said lever to preserve the end of the said stud T against the said cam I, which is provided at a definite point in the path of the said stud T with an aperture V adapted to receive under the action of the spring S the said stud T. As soon as the shaft E and cam I have rotated sufficiently to bring the aperture V into alignment with the stud T, the spring S will cause said stud to enter said aperture, and the effect of the movement of the lever P which permits said stud to enter the said aperture V, causes the clutch sleeve O to recede from that portion of the clutch which forms a rigid part of the pinion wheel M and thereby cut off the motion of the driving shaft D from the pinion M and gear wheel H, thus stopping the operating mechanism of the machine without interfering with the rotation of the main driving shaft D. In order to again set in motion the auxiliary driving shaft E and the mechanism connected therewith it is necessary to manually move the outer end of the lever P sufficiently to relieve the stud T from the aperture V and cause the clutch sleeve O to re-engage that portion of the clutch which forms a rigid part of the pinion wheel M.

The cam wheels F G upon the opposite ends of the auxiliary driving shaft E correspond with each other in outline and each is provided along a concentric portion of its periphery with the series of ratchet teeth W and adjacent thereto with the lateral flange X. At one side of said cam wheels F G is formed the depression $a$ having diverging opposite sides $b\ c$, the former merging into the line of the ratchet teeth W, while the other lettered $c$ merges into the elevated cam $d$, which when the operative parts of the machine come to a stop at the end of each revolution of the shaft E is in its upward position.

At opposite ends of the receptacle B are provided the lugs $e$ which serve as guides for the vertically reciprocating bars $f$ and support the standards $g$, the latter extending upward a suitable distance and having mounted upon them the slides $h$, which at their outer ends are secured to the upper ends of the bars $f$ and at their inner ends support the hangers $i$ which extend downward within the vertical planes of the ends of the receptacle B and support the rectangular frame $j$, the latter corresponding in outline with the interior of the receptacle B and being securely held by means of screws $a'$ upon the said hangers $i$ so as to have a vertical reciprocation therewith. The frame $j$ is provided with the inwardly projecting supporting pins $k$ and, also, with a small snap spring $m$, which at the proper time serves to lock the hinged open frame or cover $n$ downward in a horizontal position, as hereinafter explained.

The hinged cover $n$ is mounted in lugs $o$ secured at the opposite ends of the rear side of the frame $j$, and the pivoted or hinged rod of said cover $n$ is provided with a lug $p$ which is so located as to be engaged by the lug $q$ secured upon the receptacle B and extending over the edge of the latter in convenient position to be met by the lug $p$ during the upward movement of the frame $j$ and cause by its restraint on the lug $p$ the cover $n$ to turn upward to its open position. During the downward movement of the frame $j$, the lug $q$ will come into contact with the cover $n$ above its lower hinged edge and tilt the said cover forward in order that it may close downward over the frame $j$ and be there secured by means of the spring clip $m$. The vertical slide rods $f$, the slides $h$ upon the standards $g$, the hangers $i$, suspended from said slides $h$ and the frame $j$, constitute, as it were, an integral frame which has a vertical reciprocating motion; its upward position being illustrated in Fig. 2 and its lower position in Fig. 11. The lower end of the vertical rods $f$ pass through guides $e$, as above described, and also, between the studs $r, r$, which, also, operate as guides for the lower end of said rods $f$.

The frame $j$ is an independent supporting frame and receives its vertical reciprocation from the cams F, G, located at the opposite ends of the auxiliary driving shaft E, and said frame is aided in its downward movement by means of the coiled spring $s, s$, located upon the upper ends of the standards $g$ above the slides $h$. Upon the outer surfaces of the bars $f$ are secured the boxes $t, t$, whose lower inner surfaces are pawl-shaped and rest upon the cam wheels F, G, as indicated in Figs. 2 and 5, and whose outer portions inclose the vertical adjusting screws $w, w$, and at their lower ends receive followers $b'$ holding the elastic or soft cushions or plugs $x, x$, which are beyond the vertical plane of the outer cam surfaces of the wheels F, G, and are in position to come into contact with the lateral flanges X, X, when during the rotation of the said wheels F, G, the ratchet teeth W are passing below the boxes $t, t$. The purpose of the screws $w, w$, is to adjust the extent of the cushions $x, x$, which shall be exposed below the lower ends of the boxes $t, t$, and thus regulate the extent the vertical movement the said boxes $t$ and frame $j$ with their intermediate connections shall have while the teeth W are passing below the said boxes, as hereinafter explained.

When the cams F, G, are in their normal position at rest, as indicated in Fig. 3, the higher part $d$ of the said cam wheels will be uppermost and will cause the frame $j$ to have the position in which it is illustrated in Fig. 2. When power is applied to the shaft E and the cam wheels F, G, thereby set in motion, they will revolve in the direction of the arrow shown in Fig. 3, and hence the surface $c$ of the cam wheels F, G, will pass beneath the boxes $t$ and allow the same to lower into the depression $a$ of said cam, this having the effect of lowering the said boxes $t$ and frame $j$ with their intermediate connections, to the position illustrated in Fig. 11; and during the continued movement of the cam wheels F, G, the boxes $t, t$, will ride up the surfaces $b$ of the cams F, G, and the said boxes $t$ and the frame $j$ will be elevated to a position within the upper portion of the receptacle B, and below the upper edge of said receptacle but above the level of the liquid chocolate or other coating surface. At this time the teeth W of the said cam wheels F, G, will, during the rotation of the said wheels, pass below the boxes $t$ and cause said boxes to have a short vertical vibrating motion, whereby the said frame $j$ will be jarred and all superfluous chocolate shaken from the coated pieces and their supporting tray to be hereinafter referred to. The continued rotation of the cam wheels F, G, after the teeth W have passed beyond the boxes $t$, will bring the higher cam surfaces $d$ below said boxes $t$ again and elevate the same and the frame $j$ to their normal position illustrated in Fig. 2, at which time, as hereinbefore described, the stud T will snap into the aperture V, provided in the cam I, and thereby withdraw the clutch O from the pinion M and stop the machine. The vertical vibration of the frame $j$ imparts to said frame a concussive action which may be intensified by the strength of the springs $s\ s$. In the absence of the adjusting screws $w$, cushions $x$ and flange X, each vertical movement during the vibration of the frame $j$ would equal in extent the depth of the teeth W, but by means of the said adjusting screws $w$, cushions $x$ and lateral flanges X, the extent of the vertical movement of the frame $j$ during its vibration may be regulated at will, since it is obvious that when the screws $w$ are adjusted downward, they will cause the lowering of the cushions $x$ toward the flanges X, and that if said cushions $x$ are sufficiently adjusted they may prevent the lower pawl shaped ends of the boxes $t$ from reaching the depth of the teeth W by coming into contact with the flanges X prior to the said boxes reaching the lower ends of the notches between the teeth W. The vibration of the frame $j$ and consequently the extent of its jarring action may thus be regulated and adjusted by means of the screws $w$, and at the same time it is to be observed that the cushions $x$ will prevent any undue noise resulting from the action of the teeth W traveling below the boxes $t$.

After the cam wheels F, G, have attained their position illustrated in Fig. 3 and the operative parts of the machine have come to rest, the said cam wheels will not again start to rotate until the attendant by means of the handle $y$ will move the lever P sufficiently to withdraw the said stud T from the aperture V and throw the clutch O into contact with the pinion M, upon which being done the motion of the driving shaft D will, as hereinbefore described, be communicated to the auxiliary driving shaft E and again set in motion the cam wheels F, G, and the other operative mechanism of the machine.

Upon the opposite ends of the independent supporting frame $j$, is provided the vertical guides A', which receive the pivots B' secured at the ends of the vertically movable tray C' provided with the series of pockets D' adapted to receive the pieces or drops to be coated, and which tray C' is suspended at the lower ends of the chains E' which pass over pulleys F' mounted upon the slides $h$, the lower ends of the said chains E' being secured upon the said pivots B' and the other or outer ends thereof being secured to adjustable slides G' located upon the upper ends of the vibrating arms H', the lower ends of which are upon the rock shaft I', which is mounted in the lugs upon the rear surface of the table A. The rock shaft I' is provided with an inwardly extending arm J' carrying a roller K' in contact with the periphery of the cam I, as illustrated in Fig. 3. During the rotation of the auxiliary driving shaft E, the cam I will effect a vibratory motion in the arms H' causing their upper ends to approach the machine for the purpose of lowering the tray C' and then recede from said machine at the proper time to elevate the said tray C'. The tray C' being hung upon pivots is reversible, the pockets D' being thus capable of having their mouths turned upward or downward as may be desired. In the normal position of the tray C' the pockets D' will point downward, as shown in Fig. 10, and thereafter upon the reversal of the tray C' upon its pivots, the said pockets D' will point upward, as indicated in Figs. 3 and 9. The purpose of thus reversing the tray C' will be explained hereinafter.

The upper end of the guides A' for the pivots B' is provided with a cam surface L', and the pivots of the said tray C' carry the cams M', which when the said tray C' is reversed or turned with the bottom of the pockets D' pointing upward, will impinge upon the said cam surfaces L' and thereby cause the said tray C' to have a slightly higher elevation than when said tray C' is in its normal position with the bottoms of the pockets D' pointing downward. When the tray C' is turned so that its pockets D' are pointed downward, the cams M' will ride upon the said cam surfaces L' and the pivots B' will then be at the upper side of the tray C' and the latter will be held a short distance below the level it assumes when reversed, as illustrated in Fig. 10.

When the tray C' is at its higher elevation shown in Fig. 3, it will be in line with the upper end of the vibrating arm Q, which during its vibration, will lightly rap against the tray C' and tend to jar the coated drops or pieces from the pockets thereof, as hereinafter referred to.

In order that the tray C' may be lightly locked in its horizontal position, I have provided the spring pawl N' to engage notches in the cam M' as indicated in Figs. 3 and 6, the said notches being inclined at both edges so as to permit the attendant to readily turn the tray C' without handling the pawl N'.

The tray C' is composed of the outer framing O' and the series of oppositely, laterally and correspondingly bent wires P' Q' and the intermediate downwardly bent flattened wires R', which at the points S' between the oval outlines formed by the curvatures or bendings of the wires P' Q', are soldered to said latter wires, thereby forming a solid frame composed of the lines of pockets D'. The pockets D' are thus made oval at their mouths and their depth is regulated by the extent of the curvature or bending of the flattened wires R', and in operation it is intended that the pockets D' shall not contact with the pieces or drops to be coated, except at three points, two being at the opposite sides of the pocket and the other at the bottom of the pocket, thus leaving abundant means for the coating substance to encompass the drops without danger of the latter becoming caught or fastened into the pockets or having a symmetrical rounded appearance, but rather the appearance of hand made goods.

The tray C' is provided with projecting lugs T' which are secured to the outer framing O' and constitute stops for preventing the breakage or bruising of the pieces or drops while being introduced to or removed from the pockets D'.

When it is desired to introduce the pieces or drops to be coated to the tray C', I, for convenience, first arrange them upon a board or frame V', illustrated in Fig. 12, which in the arrangement of its pockets corresponds with the tray C', and then reverse the frame C' upon its pivots so that the pockets D' will point upward, as indicated in Fig. 3, care at this particular time being taken to give the reversed tray C' a slight inclination so that the vibrating rod Q, will not act upon the said tray. The tray C' having been reversed in position and the pieces or drops to be coated having been placed upon the frame or board V', the latter is placed directly below the said tray C' and moved upward toward the same in order that the pieces or drops may enter the pockets D' and the board or frame V' come into contact with the stops T', whereupon while the said board or frame V' is in the position stated, the tray C' will be reversed upon its pivots so that its pockets D' will point downward and upon this being done, the frame or board V' will be removed, leaving the pieces or drops in the said pockets D'. After the board or frame V' has thus been removed from the frame C', the machine will be set in motion by the movement of the handle y and lever P, as hereinbefore explained, the result being that the cam I will turn to permit the lowering of the roller K' and arm J' and thereby cause the rods H' to approach the receptacle B, whereby the chains E' under the weight of the tray C', will pass over the pulleys F' and permit the said tray C' to lower upon the supporting pins k in the frame j, as indicated in Fig. 11, upon arriving at which position, the rods H' further approaching the receptacle B and the cam wheels F, G, being in motion, the tray j supporting the frame C' will be lowered into the receptacle B, the lug q in the meantime starting the cover n to close over the tray C'. The downward movement of the tray j carrying the frame C', results in the pieces or drops held in the pockets D' being coated with the chocolate or other substance within the receptacle B. The continued motion of the cam wheels F, G, first causes the elevation of the frame j carrying the tray C' to a point within the upper edges of the receptacle B above the liquid coating substance, when as above described, the teeth W of the said cam wheels will pass below the boxes t and cause the concussive vibration of said frame j for the purpose of jarring from the frame and the pieces or drops held in the pockets D' all superfluous chocolate, leaving the drops or pieces in proper merchantable condition and form. As soon as the teeth W of the cam wheels F G have passed from the said boxes t, the cam surfaces d of said wheels F G will pass below the said boxes t and elevate the frame j to its upward position illustrated in Fig. 3, this having the effect of causing the arm q to elevate or open the cover n, which movement of the cover is followed by the action of the cam I on the rods H', which cam at this time will through the roller K', arm J', rock shaft J', rods H' and chains E' draw the tray C' upward to its normal position shown in Fig. 10.

Upon the tray C' reaching its upward position, the stud T on the lever P will snap into the aperture V of the cam I and the clutch O will be withdrawn from the pinion M, thus stopping the machine and permitting the removal of the coated pieces or drops from the tray C'.

The removal of the coated drops or pieces from the tray C' may be quickly accomplished by applying over said tray a plate W', shown in Fig. 14, which will rest upon the lugs T', and then reversing the said tray C' upon its pivots so that the pockets D' will be turned upward with their mouths downward, as shown in Fig. 15, at which time the plate N' will be in a position to receive all of the drops or pieces which may fall from the tray C', the detachment of the said pieces from the said tray C' being aided by the vibration of the rod Q against the said tray. If any of the coated pieces should bind in the pockets D' the jarring of the tray C' by the rod Q will secure their detachment therefrom. The coated pieces or drops having passed from the pockets D' upon the plate W', the latter will be lowered from the tray C' and thus all of the coated pieces or drops may be removed at once.

The frame or board V' by which the pieces to be coated are introduced to the tray C' and the plate W' by which the coated pieces are removed from said tray C' are provided upon opposite edges with the lugs X' fitting the opposite edges of the tray C' and serving to prevent during the reversal of the tray C' the bruising or injuring of the drops either coated or to be coated. The lugs X' preserve the due relation of the frame V' or plate W' with the edges of the tray C' and the lugs T' serve as stops to prevent the said frame V' or the plate W' approaching too closely to the tray C'. The plate W' may be provided with a handle Y' for convenience in carrying the same. As soon as the coated drops or pieces have been removed from the tray C', the latter will be in condition to receive another supply of pieces or drops to be coated and the operation of the machine above described may be at once repeated as frequently as desired.

The invention is not limited to the use of any special coating substance in the receptacle B, nor to the character of the pieces or drops to be coated, nor is the invention limited to the details of construction, which may be varied within the scope of the invention as claimed.

What I claim as my invention, and desire to secure by Letters Patent, is—

1. In a machine of the character described, the receptacle to contain the coating substance, and the vertically movable tray reversibly mounted over said receptacle and adapted to hold the pieces to be coated, combined with means for raising and lowering said tray; substantially as and for the purposes set forth.

2. In a machine of the character described, the receptacle to contain the coating substance, and a vertically reciprocating frame adapted to support the tray holding the pieces to be dipped into the coating substance, combined with cam wheels supporting and directing the movement of said frame, and having the teeth to effect the jarring of said frame during a part of the revolution of said cam wheels, and projections from said reciprocating frame to ride on said cam wheels and to be engaged by said teeth; substantially as set forth.

3. In a machine of the character described, the receptacle to contain the coating substance, and the vertically movable tray reversibly mounted and adapted to hold the pieces to be coated, combined with means for raising and lowering said tray, means for arresting said tray after it has made part of its upward movement, means for jarring said tray while thus arrested, and means for jarring said tray after it has completed its upward movement and been reversed; substantially as set forth.

4. In a machine of the character described, the receptacle to contain the coating substance, and the vertically movable tray adapted to hold the pieces to be coated, combined with means actuated from the driving shaft for lowering and raising said tray, a clutch on said shaft by which the power may be cut off at any time, and a clutch for automatically arresting the operative mechanism at each upward movement of said tray; substantially as set forth.

5. In a machine of the character described, the receptacle to contain the coating substance, the vertically movable tray to receive the pieces to be coated, and means for lowering said tray, combined with an independent vertically reciprocating open frame adapted to receive and support the said tray when lowered thereupon, means for lowering and raising said independent frame, and means for elevating said tray carrying said pieces from said independent frame after the latter has completed its upward movement; substantially as set forth.

6. In a machine of the character described, the receptacle to contain the coating substance, the vertically movable tray adapted to receive the pieces to be coated, and means for independently raising and lowering said tray, combined with the independent vertically reciprocating frame adapted to support the said tray when lowered thereupon, cam mechanism for lowering and raising said independent frame, and ratchet mechanism for jarring said frame and tray after they have been elevated from the coating substance and before the tray has reached its upper position; substantially as set forth.

7. In a machine of the character described, the receptacle to contain the coating substance, the vertically movable tray adapted to hold the pieces to be coated, and the rock-shaft, arms and chains by which said tray is supported, combined with means for rocking said shaft to raise or lower said tray, the independent frame below and adapted to receive the said tray, and means for imparting to the same a vertically reciprocating motion; substantially as set forth.

8. In a machine of the character described, the receptacle to contain the coating substance and the vertically movable tray adapted to hold the pieces to be coated, combined with the independent supporting frame adapted to receive said tray, the cam wheels supporting and directing the movement of said independent frame and having teeth to effect the jarring of said frame during a part of the revolution of said cam wheels, and projections from said independent frame to ride on said cam wheels and to be engaged by said teeth; substantially as set forth.

9. In a machine of the character described the receptacle to contain the coating substance, and a vertically reciprocating frame adapted to support the tray holding the pieces to be dipped into the coating substance, combined with the cam wheels supporting and directing the movement of said frame and having the teeth and lateral flanges, and the cushions connected with said frame to contact with said flanges while the said teeth are jarring the said frame; substantially as set forth.

10. In a machine of the character described, the receptacle to contain the coating substance, and the reciprocating frame over said receptacle, combined with the tray adapted to hold the pieces to be coated and to be inclosed within said frame, the cover holding said pieces in position, and means for dipping said frame and tray into the coating substance; substantially as set forth.

11. In a machine of the character described, the vertically movable tray adapted to receive the pieces to be coated and reversibly mounted, guides for the tray, and cams on the bearings of said tray whereby on the reversal of the tray the latter is caused to be elevated; substantially as shown and described.

12. In a machine of the character described, the vertically movable tray adapted to receive the pieces to be coated and reversibly mounted, combined with the vibrating rod adapted to contact with said tray when in its reversed position; substantially as shown and described.

13. In a machine of the character described, the vertically movable tray having a series of pockets adapted to receive the pieces to be coated, said tray being reversibly mounted on pivotal bearings, combined with the spring clip N' for locking said tray in its horizontal position, and means for lowering and raising said tray; substantially as shown and described.

14. In a machine of the character described, the receptacle adapted to contain the coating substance, the independent supporting frame over the same, and means for lowering and raising said frame, combined with the vertically movable tray adapted to receive the pieces to be coated, means for lowering and raising the same, the cover for the said tray, and means for operating said cover; substantially as set forth.

15. In a machine of the character described, the receptacle adapted to contain the coating substance, the vertically reciprocating frame $j$, the cover $n$ hinged to said frame and having the lug $p$, and the lug $q$ secured to said receptacle, combined with the tray $C'$ having a series of pockets, the chains suspending said tray $C'$, and the rock-shaft actuated by a cam and having rods connected with said chains; substantially as set forth.

16. In a machine of the character described, the receptacle adapted to contain the coating substance, and the supporting frame $j$ adapted to enter said receptacle, combined with the cam wheels F, G, supporting said frame on their periphery and having the teeth W and cam-surfaces $a$, $b$, $c$ and $d$, and bearing projections connected with said frame and riding on said cam wheels; substantially as set forth.

17. In a machine of the character described, the receptacle adapted to contain the coating substance, and the supporting frame $j$ adapted to enter said receptacle and having bearings $t$ provided with cushions $x$, combined with the cams F, G, supporting said frame at said bearings and having the lateral flanges X, teeth W and cam-surfaces $a$, $b$, $c$ and $d$, the said bearings $t$ resting on the periphery of said cams and the said cushions $x$ being adapted to contact with said flanges X; substantially as set forth.

18. In a machine of the character described, the receptacle to contain the coating substance, and the supporting frame $j$ adapted to enter said receptacle and having bearings $t$ provided with the contacts $x$ and adjusting screws $w$, combined with the cams F, G, supporting and directing the movement of said frame at said bearings and having the lateral flanges X and teeth W; substantially as set forth.

Signed at New York, in the county of New York and State of New York, this 18th day of August, A. D. 1894.

WILLIAM WALTER.

Witnesses:
CHAS. C. GILL,
EDWARD D. MILLER.